2,853,483
MONOAZO DYESTUFFS

Paul Rhyner, Basel, Switzerland, assignor to Ciba Limited, Basel, Switzerland, a Swiss firm No Drawing. Application January 24, 1956
Serial No. 561,158

Claims priority, application Switzerland February 4, 1955

6 Claims. (Cl. 260—205)

This invention provides valuable monoazo-dyestuffs free from groups imparting solubility in water and corresponding to the general formula (1) $$R_1-N=N-R_2$$

in which $R_1$ represents a benzene radical containing as the sole substituent a tertiary amino group in para-position to the azo linkage, and $R_2$ represents a benzene radical which contains in meta-position relatively to one another two amino groups the two nitrogen atoms of which together carry at least one and at most three substituents including not more than one aromatic radical.

The invention also provides a process for the manufacture of the monoazo-dyestuffs of the Formula 1, in which a diazotized 1-aminobenzene, which contains as the sole further substituent a tertiary amino group in the 4-position, is coupled with a 1:3-diaminobenzene free from groups imparting solubility in water and of which the two nitrogen atoms together carry at least one and at most three substituents including not more than one aromatic radical.

As diazo-components for use in the process of the invention there are used with advantage compounds of the formula (2) 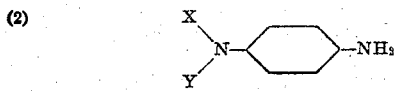

in which X and Y represent lower alkyl radicals which may contain a hydroxyl, methoxy or cyano group. In general, those compounds of the Formula 2 are especially advantageous, in which X and Y each contain at most two carbon atoms. As examples of such diazo-components there may be mentioned 1-amino-4-dimethylaminobenzene,
1-amino-4-diethylaminobenzene,
1-amino-4-ethyl-β-hydroxyethylaminobenzene,
1-amino-4-ethyl-β-cyanoethylaminobenzene,
1-amino-4-methyl-β-cyanoethylaminobenzene and
1-amino-4-di-(β-cyanoethyl)-aminobenzene.

As coupling components there are used 1:3-diaminobenzenes, of which the two nitrogen atoms together carry at least one and at most three substituents including not more than one aromatic radical; for example, one of these substituents may be an aryl radical, especially a further benzene radical, and all the other substituents may be aliphatic radicals. There also come into consideration cyanoalkyl, hydroxyalkyl and especially alkyl groups, which advantageously contain few, for example, one or two, carbon atoms. When two or three such radicals are present in the coupling component they may be distributed among the two amino groups in any desired manner. When only alkyl groups are present, there may be mentioned, for example, the following possibilities (3) 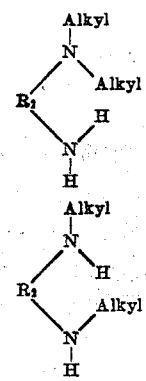

(4) 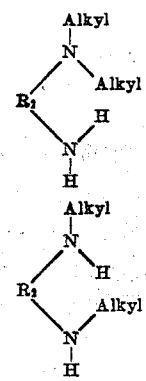

(5) 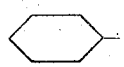

in which formulae $R_2$ represents a benzene radical bound in the 1:3-positions to the amino groups, and which may contain further substituents, for example, a methyl group, but which is advantageously free from further substituents and then corresponds to the formula (6) 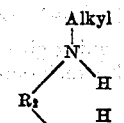

For example, the following compounds may be used as coupling components:

1-methylamino-3-aminobenzene,
1-dimethylamino-3-aminobenzene,
1:3-di-(methylamino)-benzene,
1-dimethylamino-3-methylaminobenzene,
1-diethylamino-3-aminobenzene,
1-di-(β-hydroxyethyl)-amino-3-aminobenzene,
1-β-hydroxyethyl-methylamino-3-aminobenzene,
1-amino-3-dimethylamino-4-methylbenzene,
1-phenylamino-3-aminobenzene (usually named 4-amino-1:1′-diphenylamine),
1-dimethylamino-3-(β-cyanoethyl)-aminobenzene,
1-dimethylamino-3-amino-6-methylbenzene.

The coupling components of the aforesaid constitution are in part known, and can be made by methods in themselves known. It is generally desirable in the present process to use starting materials which are as pure as possible, that is to say, unitary compounds which are practically free from isomers and homologues. This applies more especially to the coupling components.

The coupling of the diazo-compounds with the coupling components can be carried out by a method in itself known, advantageously in an acid medium, for example, an acetic acid or hydrochloric acid medium.

Those dyestuffs of the above general Formula 1 in which $R_2$ contains an $H_2N$-group, an

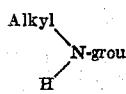

or an

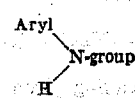

in ortho-position to the azo linkage and contains an alkylated amino group in para-position to the azo linkage, can be prepared by splitting off the acyl group in a monoazo-dyestuff, which is free from groups imparting solubility in water and corresponds to the formula (7) 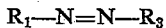

in which $R_1$ has the meaning given above, and $R_3$ represents a benzene radical, which contains in ortho-position to the azo linkage an

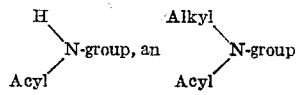

or an

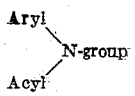

and in para-position to the azo linkage an alkylated amino group.

The starting materials of the Formula 7 are prepared by coupling a diazotized 1-aminobenzene, which contains in the 4-position a tertiary amino group and is free from further substituents, with a diaminobenzene which is free from groups imparting solubility in water and contains an

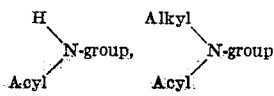

or an

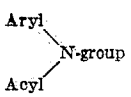

and in meta-position to these groups an alkylated amino group. The coupling components for this process are advantageously prepared by acylating, for example, acetylating, diaminobenzenes, which contain an $H_2N$-group, an

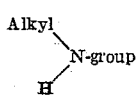

or an

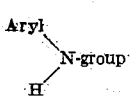

and in meta-position to the latter group a nitro group, and subsequently reducing the nitro group to the $H_2N$-group.

In analogous manner there can also be prepared monoazo-dyestuffs in which the radical $R_2$ contains in ortho-position to the azo-linkage an

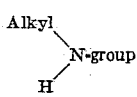

or an

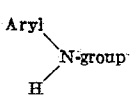

and in para-position to the azo linkage an $H_2N$-group, by splitting off the acyl group in a monoazo-dyestuff which is free from groups imparting solubility in water and corresponds to the formula (8) 

in which $R_1$ has the meaning given above, and $R_4$ represents a benzene radical which contains in ortho-position to the azo linkage an

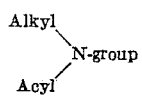

or an

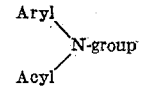

and in para-position to the azo linkage an $H_2N$-group.

The new dyestuffs of the Formula 1 are suitable for dyeing a wide variety of materials, but especially for dyeing or printing fibers of polyacrylonitrile. For this purpose it is of advantage to fix the dyestuff in the form of a salt thereof on the polyacrylonitrile fibers. These salts, in which the dyestuff forms the basic radical, may contain any desired acid radical, for example, the radical of an inorganic or organic monobasic, dibasic or polybasic acid. As examples there may be mentioned the following acids: Inorganic acids, such as hydrochloric acid, hydrobromic acid, sulfuric acid, phosphoric acid, amidosulfonic acid, and perchloric acid; organic sulfonic acids, such as methane sulfonic acid, benzene monosulfonic acid, benzene disulfonic acids, naphthalene-1- or -2-sulfonic acid, naphthalene disulfonic acids, cymene sulfonic acid; and carboxylic acids, such as formic acid, acetic acid, propionic acid, chloracetic acid, oxalic acid, lactic acid, tartaric acid, citric acid, gluconic acid (which may be used in the form of its lactone), glutamic acid, ethylenediaminotetracetic acid, salicylic acid and phthalic acid.

Polyacrylonitrile fibers can be dyed with the new dyestuffs by the following three main methods:

A. Salts of the dyestuffs of the above kind or mixtures of bases and acids leading to their formation, are used.

B. Polyacrylonitrile fibers are dyed with dyestuff bases of the above kind and the dyeing is treated with acid.

C. Polyacrylonitrile fibers are treated with an acid and then dyed with a dyestuff base of the above kind.

It is generally of advantage to carry out the dyeing with the dyestuff base or dyestuff salt, and also the pretreatment or after-treatment with an acid, in an aqueous medium. Some of the dyestuff salts possess a fairly good to good solubility in water, so that they can be used for dyeing in the form of aqueous solutions. In the case of the free bases, to which this usually does not apply, they may be used for dyeing by the known dispersion dyeing methods customary for cellulose acetate artificial silk and nylon, in which the dyestuff is dispersed with the aid of a suitable dispersing agent, for example, a soap, sulfite cellulose waste liquor, a fatty alcohol sulfonate, a higher alkyl sulfonic acid, a benzimidazole sulfonic acid containing a higher alkyl radical in the $\mu$-position of the imidazole radical, condensation products of alcohols of high molecular weight with ethylene oxide, and substances acting in a similar manner, and in which the dyestuff is used in this form for dyeing.

In the method A referred to above the preformed salt may, for example, be dissolved or dispersed in the necessary quantity of water before dyeing, or the free base may be converted into the salt by the addition of acid in the dyebath before dyeing. It may be of advantage to use an excess of the acid. In the case of dyestuff salts which hydrolyse appreciably in the dyebath and the dyestuff base or the acid or both are in themselves only slightly soluble in water, these substances may not be completely dissolved. In this case it may be of advantage to add one of the above-mentioned dispersing agents. In general, this behaviour of the dyestuffs and the acids is not disadvantageous, because even in such cases the dyestuff is fixed on the fiber in the form of a salt, and owing to maintenance of the equilibrium between hydrolyzed and non-hydrolyzed dyestuff salt in the aqueous medium the undissolved constituents pass into solution as the salt is absorbed on to the fiber, until the dyebath is finally completely or almost completely exhausted.

When a dyeing is after-treated with an acid in accordance with method B, it is generally also useful to have the acid in excess.

This also applies to the pretreatment with acid in accordance with method C. Depending on the acid used there are considerable differences in the quantities of acid which can be fixed by a certain quantity of polyacrylonitrile fiber in the absence of dyestuff, so that the range of application of this method, as compared with methods A and B, is somewhat limited. Good results are usually obtained with organic acids.

In order to produce dyeings which are distinguished by especially favorable properties, for example, especially good properties of fastness, it is generally necessary to apply an additional treatment, and especially useful is a treatment with an aldehyde or an agent yielding aldehyde. Generally speaking, it is of advantage to combine a treatment of this kind with the aforesaid method of dyeing in which the dyestuff is fixed on the polyacrylonitrile fibers in the form of a salt.

In the treatment with an aldehyde or an agent yielding aldehyde it is especially advantageous to use aliphatic aldehydes of low molecular weight, such as acetaldehyde, glyoxal and above all formaldehyde, or an agent yielding such an aldehyde. Among agents yielding formaldehyde there may be mentioned, more especially, formaldehyde condensation products containing nitrogen, for example, hexamethylene tetramine, monomethylol-urea, hexamethylol-triaminotriazine or a precondensate of formaldehyde and dicyandiamidine.

The treatment with the aldehyde or agent yielding aldehyde may be carried out, for example, by first dyeing the polyacrylonitrile fibers with the dyestuff base or dyestuff salt, and then subjecting the dyeing, advantageously in a fresh bath, in an acid medium to after-treatment with an aldehyde or an agent yielding aldehyde, or by subjecting the dyeing to the action of the vapor of an aldehyde.

Alternatively, the polyacrylonitrile fibers may be dyed with the dyestuff of the Formula 1 in an acid medium in the presence of an aldehyde or an agent yielding aldehyde. Instead of adding the dyestuff and the agent yielding aldehyde separately to the dyebath, these two substances may first be mixed together, if desired, with the addition of other substances, for example, a dispersing agent or a hydrotropic agent such as urea. In this manner valuable dyestuff preparations are obtained.

Furthermore, the dyestuff may be reacted, advantageously in an acid medium, with an aldehyde of low molecular weight, especially formaldehyde, to form a condensation product, which is used for dyeing the polyacrylonitrile fibers.

The treatment with an aldehyde or an agent yielding aldehyde, or the dyeing operation in the presence of such a substance, is advantageously carried out at a raised temperature, for example, at the boiling temperature of the dyebath or in the vicinity thereof. If desired, the treatment may be carried out in a closed vessel at a temperature above 100° C.

The new dyestuffs are especially suitable for producing dark tints. Especially valuable due to the purity of their tints and also their good fastness to light, washing and sublimation, are those dyeings produced in the manner described above, to which an aldehyde treatment has been applied, and which are, for example, of blue tints.

The tints of the dyeings on polyacrylonitrile fibers produced with the dyestuffs of this invention do not shift towards grey or black when subjected to the action of salts of chromic acid, but retain their blue tint, and this is especially advantageous in dyeing mixed yarns or mixed fabrics of polyacrylonitrile fibers with wool, when a chrome dyestuff is used for dyeing the wool.

The following examples illustrate the invention, the parts and percentages being by weight:

*Example 1*

136 parts of 1-dimethylamino-4-aminobenzene are dissolved in 100 parts of water and 300 parts of hydrochloric acid of 30 percent strength, about 1000 parts of ice are added, and diazotization is brought about with 200 parts of a 5 N-solution of sodium nitrite.

The cold diazo-solution is run at room temperature (about 20° C.) into a solution of 136 parts of 1-dimethylamino-3-aminobenzene in 200 parts of water and 64 parts of hydrochloric acid of 30 percent strength.

There are then added 200 parts of crystalline sodium acetate and the whole is stirred for a little time. By the further addition of sodium acetate or the addition of sodium chloride, the dyestuff is completely precipitated.

The dyestuff of the formula (9)

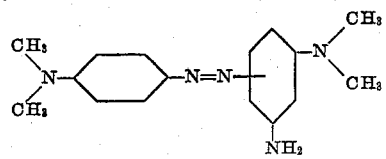

obtained in this manner can be converted into a soluble salt thereof by treatment with hydrochloric acid followed by drying. This dyestuff dyes "Orlon" (polyacrylonitrile fibers) a pure blue tint from a bath containing acetic acid and formaldehyde.

A prerequisite for obtaining a pure tint is the purity of the 1-dimethylamino-3-aminobenzene. The latter product can be obtained by methylating 1-amino-3-nitrobenzene with methanol and sulfuric acid in an autoclave, and then reducing the nitro group.

Valuable blue dyeings on polyacrylonitrile fibers are obtained with the aid of formaldehyde with salts of the dyestuffs obtainable in the manner described above from the diazo-components and coupling components given in the following table:

|   | Diazo-component | Coupling component |
|---|---|---|
| 1 | 1-amino-4-dimethylaminobenzene. | 1-methylamino-3-aminobenzene. |
| 2 | ----do---- | 1:3-di-(methylamino)-benzene. |
| 3 | ----do---- | 1-dimethylamino-3-(β-cyanethyl)-aminobenzene. |
| 4 | ----do---- | 1-di-(β-hydroxyethyl)-amino-3-aminobenzene. |
| 5 | 1-amino-4-diethylaminobenzene. | 1-dimethylamino-3-aminobenzene. |
| 6 | 1-amino-4-dimethylaminobenzene. | 1-dimethylamino-3-methylamino. |
| 7 | ----do---- | 1-phenylamino-3-aminobenzene. |
| 8 | ----do---- | 1-dimethylamino-3-amino-6-methylbenzene. |
| 9 | 1-amino-4-ethyl-hydroxyethyl-aminobenzene. | 1-dimethylamino-3-aminobenzene. |
| 10 | 1-amino-4-methyl-cyanethyl-aminobenzene. | Do. |

*Example 2*

136 parts of 1-dimethylamino-4-aminobenzene are diazotized as described in Example 1, and introduced into 178 parts of 1-dymethylamino-3-acetylaminobenzene in 200 parts of water and 100 parts of hydrochloric acid of 30 percent strength.

By the addition of about 200 parts of crystalline sodium acetate, the dyestuff is precipitated, and it is then filtered off with suction. The filter residue is then boiled for 2–5 hours with sulfuric acid of 30 percent strength in order to split off the acetyl group. The solution is cooled with ice, then rendered alkaline with sodium hydroxide solution, and the precipitated dyestuff is filtered off with suction and converted into a soluble salt thereof by treatment with hydrochloric acid.

The 1-dimethylamino-3-acetylaminobenzene is prepared in known manner from 1-dimethylamino-3-nitrobenzene by reduction followed by acetylation of the amino group.

*Example 3*

136 parts of 1-dimethylamino-4-aminobenzene are diazotized as described in Example 1, and introduced into 164 parts of 1-N-methyl-N-acetylamino-3-aminobenzene dissolved in 200 parts of water and 100 parts of hydrochloric acid of 30 percent strength.

The dyestuff is precipitated by the addition of 200 parts of crystalline sodium acetate. The product is filtered off with suction, and then heated for 2–5 hours at the boil with sulfuric acid of 30 percent strength to bring about hydrolysis. The cold solution is mixed with sodium hydroxide solution; the dyestuff so precipitated is filtered off with suction and converted into a soluble salt thereof by treatment with hydrochloric acid.

The 1-N-methyl-N-acetylamino-3-aminobenzene can be obtained in known manner by monoalkylating 1-amino-3-nitrobenzene, acetylation and reduction of the nitro group.

*Example 4*

2 parts of the hydrochloride of the dyestuff of the above Formula 9 are pasted with 2 parts of acetic acid of 40 percent strength, and then covered with a little water and boiled. The solution is added to 4000 parts of water, and there are added 3 parts of acetic acid of 40 percent strength, 1 part of sodium acetate; 2–4 parts of a dispersing agent, for example, a condensation product of an alcohol of high molecular weight with ethylene oxide, and 2.5 parts of formaldehyde solution of 30 percent strength.

100 parts of boiled yarn of polyacrylonitrile fibers ("Orlon") are entered at 50–70° C., the temperature is raised to 100° C. in the course of 45 minutes, and boiling is continued for one hour. The material is then rinsed and, if desired, after-treated with an aqueous solution of a non-ionic wetting agent. The blue dyeing so obtained is distinguished by its good properties of fastness.

What is claimed is:

1. A monoazo dyestuff which in its free base state corresponds to the formula

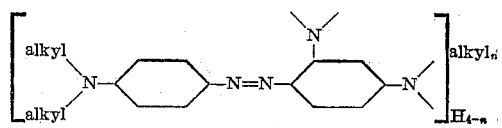

in which each alkyl group contains at the most 2 carbon atoms and $n$ represents a whole number of at the most 3.

2. A monoazo dyestuff which in its free base state corresponds to the formula

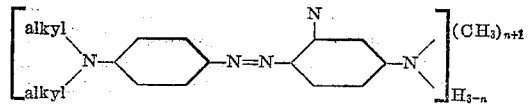

in which each alkyl radical contains at the most 2 carbon atoms and $n$ represents a whole number of at the most 2.

3. A monoazo dyestuff which in its free base state corresponds to the formula

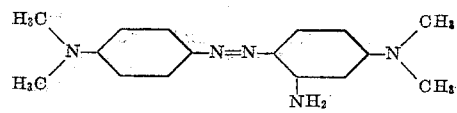

4. A monoazo dyestuff which in its free base state corresponds to the formula

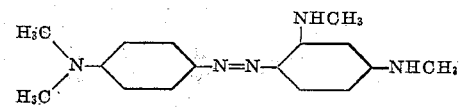

5. A monoazo dyestuff which in its free base state corresponds to the formula

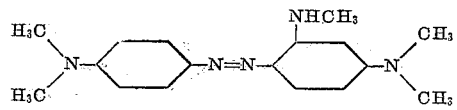

6. A monoazo dyestuff which in its free base state corresponds to the formula

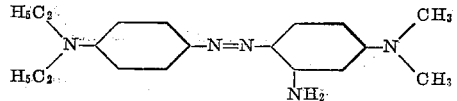

References Cited in the file of this patent

UNITED STATES PATENTS

| | | |
|---|---|---|
| 1,850,155 | Reddelien et al. | Mar. 22, 1932 |
| 2,216,446 | McNally et al. | Oct. 1, 1940 |

FOREIGN PATENTS

| | | |
|---|---|---|
| 32,502 | Germany | Oct. 7, 1884 |

UNITED STATES PATENT OFFICE
Certificate of Correction

Patent No. 2,853,483  September 23, 1958

Paul Rhyner

It is hereby certified that error appears in the printed specification of the above numbered patent requiring correction and that the said Letters Patent should read as corrected below.

Column 6, line 66, for "1-dymethylamino-" read —1-dimethylamino- —; column 8, lines 7 to 11 inclusive, the formula should appear as shown below instead of as in the patent—

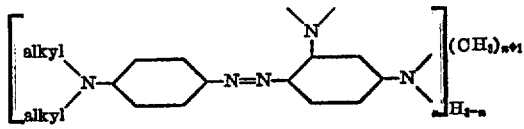

Signed and sealed this 19th day of May, 1959.

[SEAL]

Attest:
KARL H. AXLINE,
*Attesting Officer.*

ROBERT C. WATSON,
*Commissioner of Patents.*